US012583472B2

(12) United States Patent
   Maeda

(10) Patent No.:   US 12,583,472 B2
(45) Date of Patent:      Mar. 24, 2026

(54) DRIVING ASSISTANCE DEVICE, VEHICLE, METHOD, AND COMPUTER READABLE STORAGE MEDIUM

(71) Applicant: HONDA MOTOR CO., LTD., Tokyo (JP)

(72) Inventor: Yoshiki Maeda, Tokyo (JP)

(73) Assignee: HONDA MOTOR CO., LTD., Tokyo (JP)

( * ) Notice:   Subject to any disclaimer, the term of this patent is extended or adjusted under 35 U.S.C. 154(b) by 92 days.

(21) Appl. No.: 18/397,477

(22) Filed:   Dec. 27, 2023

(65)            Prior Publication Data
      US 2024/0246555 A1      Jul. 25, 2024

(30)         Foreign Application Priority Data
   Jan. 23, 2023   (JP) ................................. 2023-008176

(51) Int. Cl.
   *B60W 50/14*         (2020.01)
   *B60W 40/02*         (2006.01)
   *B60W 40/08*         (2012.01)
   *B60W 60/00*         (2020.01)
(52) U.S. Cl.
   CPC ............ *B60W 50/14* (2013.01); *B60W 40/02* (2013.01); *B60W 40/08* (2013.01); *B60W 60/0059* (2020.02); *B60W 2556/10* (2020.02)
(58) Field of Classification Search
   CPC .. B60W 50/14; B60W 60/0059; B60W 40/02; B60W 40/08; B60W 2556/10
   USPC ........................................................ 340/438
   See application file for complete search history.

(56)            References Cited

U.S. PATENT DOCUMENTS

| | | | | |
|---|---|---|---|---|
| 9,682,708 | B2 * | 6/2017 | Maruyama ............ | B60W 10/04 |
| 10,137,907 | B2 | 11/2018 | Mori et al. | |
| 10,935,974 | B1 * | 3/2021 | Fields ................... | B60W 30/17 |
| 11,077,858 | B2 * | 8/2021 | Morimoto ............. | B60W 50/16 |
| 11,760,371 | B2 * | 9/2023 | Muramatsu ..... | B60W 30/18163 |
| | | | | 340/438 |
| 12,296,854 | B2 * | 5/2025 | Churay ............ | B60W 60/0025 |
| 2016/0091896 | A1 | 3/2016 | Maruyama | |

(Continued)

FOREIGN PATENT DOCUMENTS

| | | |
|---|---|---|
| JP | 2016-071513 A | 5/2016 |
| JP | 2016-197390 A | 11/2016 |

(Continued)

OTHER PUBLICATIONS

Japanese Office Action for Japanese Patent Application No. 2023008176 mailed Sep. 20, 2024.

*Primary Examiner* — Naomi J Small
(74) *Attorney, Agent, or Firm* — THOMAS | HORSTEMEYER, LLP

(57)            ABSTRACT

An in-vehicle driving assistance device is configured to decide whether or not to use a driving assistance function based on a travel environment of a vehicle. A notification unit is configured to notify a driver of the vehicle of a guidance recommending use of the driving assistance function in a case where the decision unit decides that the driving assistance function is usable. Also, a recording unit is configured to record a reaction from the driver to the notification by the notification unit as a reaction history, and a determination unit is configured to determine a mode of the notification by the notification unit based on the reaction history recorded in the recording unit.

9 Claims, 3 Drawing Sheets

(56)  References Cited

U.S. PATENT DOCUMENTS

| | | | |
|---|---|---|---|
| 2018/0118223 | A1 | 5/2018 | Mori et al. |
| 2018/0154905 | A1* | 6/2018 | Yoshizu ............... G06V 20/597 |
| 2018/0281856 | A1* | 10/2018 | Talamonti ............ B62D 15/029 |
| 2022/0289248 | A1* | 9/2022 | Niewiadomski ....... B60K 35/10 |

FOREIGN PATENT DOCUMENTS

| | | | |
|---|---|---|---|
| JP | 2017-106863 A | 6/2017 |
| JP | 2022-160266 A | 10/2022 |

* cited by examiner

F I G. 1
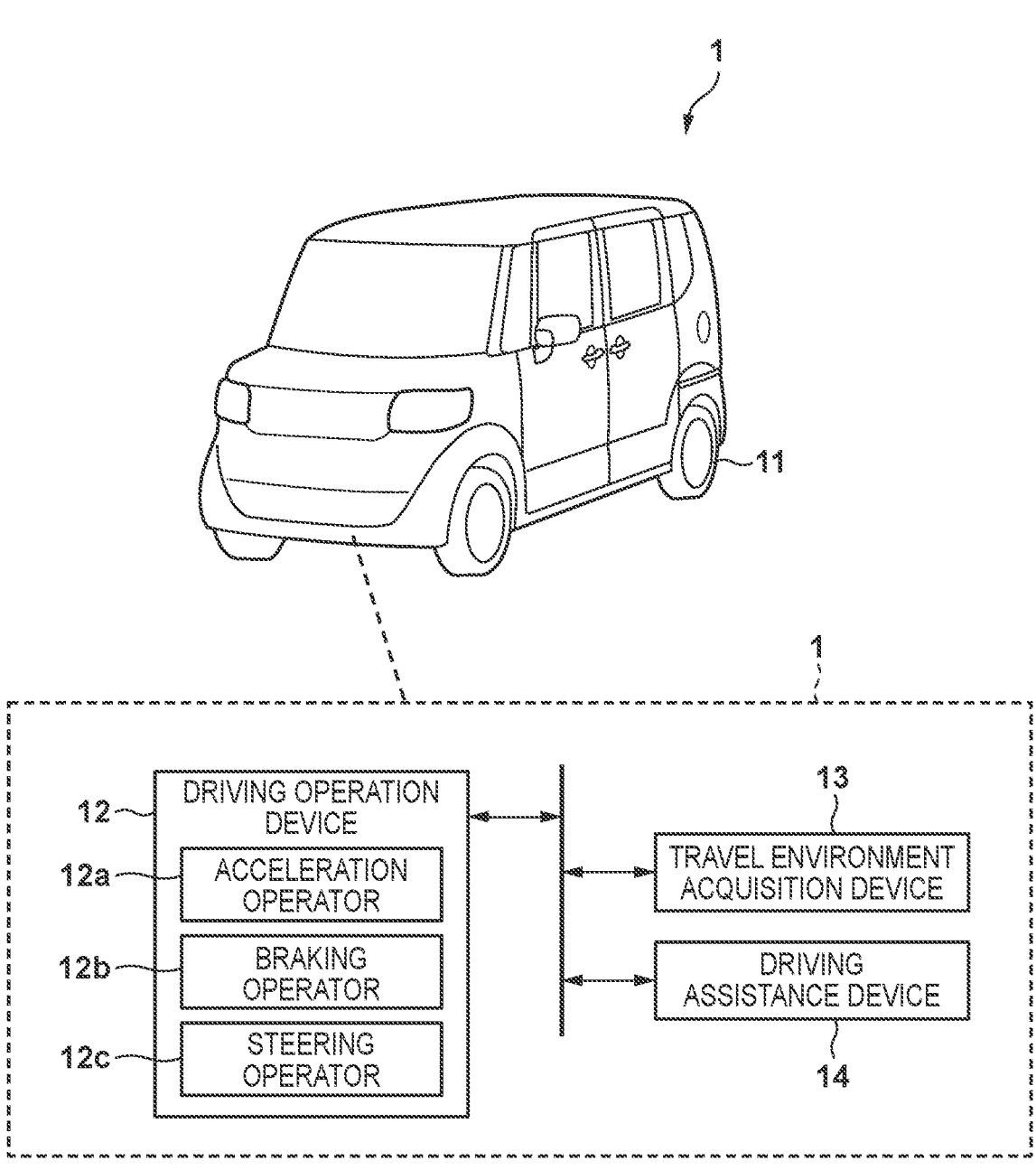

F I G. 3
DB1
|  | CT1 | CT2 |
|---|---|---|
| USER U1 | 10 | 5 |
| USER U2 | 5 | 10 |
| USER U3 | 5 | 5 |
| USER U4 | 15 | 0 |
| USER U5 | 0 | 15 |
| ⋮ | ⋮ | ⋮ |
F I G. 4
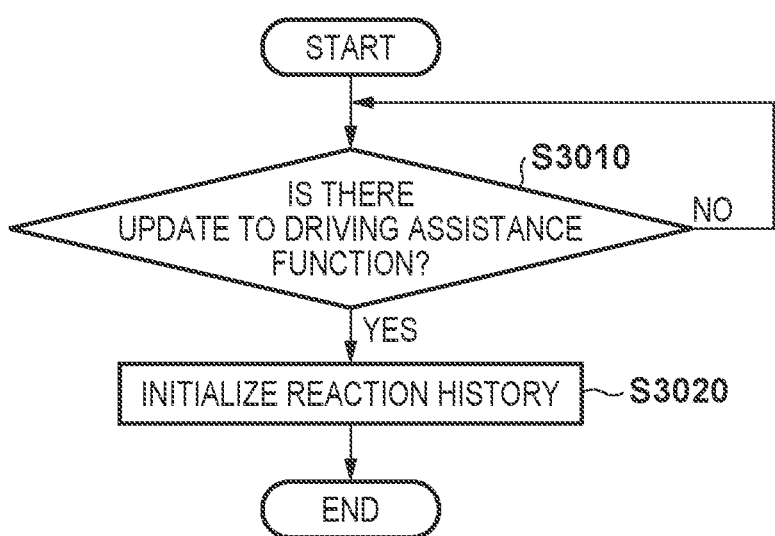

DRIVING ASSISTANCE DEVICE, VEHICLE, METHOD, AND COMPUTER READABLE STORAGE MEDIUM

CROSS-REFERENCE TO RELATED APPLICATION

This application claims priority to and the benefit of Japanese Patent Application No. 2023-008176, filed on Jan. 23, 2023, the entire disclosure of which is incorporated herein by reference.

BACKGROUND OF THE INVENTION

Field of the Invention

The present invention mainly relates to a driving assistance device.

Description of the Related Art

Some vehicles have a driving assistance function performed by an ECU in place of a driver for a part or all of a driving operation (see Japanese Patent Laid-Open No. 2017-106863). In such a vehicle, a predetermined operation unit is provided in a driver's seat, and the driver can use the driving assistance function by performing an operation input to the operation unit.

In general, there may be an area where the use of the driving assistance function is permitted and an area where the use of the driving assistance function is not permitted. Therefore, it is conceivable to notify the driver that the use of the driving assistance function is recommended when the vehicle enters the area where the use of the driving assistance function is permitted. On the other hand, the repeated notification may increase the burden on the driver.

SUMMARY OF THE INVENTION

The present invention improves usability of a vehicle having a driving assistance function.

One aspect of the invention relates to an in-vehicle driving assistance device, comprising a decision unit configured to decide whether or not to use a driving assistance function based on a travel environment of a vehicle, a notification unit configured to notify a driver of the vehicle of a guidance recommending use of the driving assistance function in a case where the decision unit decides that the driving assistance function is usable, a recording unit configured to record a reaction from the driver to the notification by the notification unit as a reaction history, and a determination unit configured to determine a mode of the notification by the notification unit based on the reaction history recorded in the recording unit.

Further features of the present invention will become apparent from the following description of exemplary embodiments (with reference to the attached drawings).

BRIEF DESCRIPTION OF THE DRAWINGS

FIG. 1 is a perspective view of a structural example of a vehicle according to an embodiment;

FIG. 3 is a diagram illustrating an example of a list of reaction histories; and FIG. 4 is a flowchart illustrating an example of control contents by the driving assistance device.

DESCRIPTION OF THE EMBODIMENTS

Figure 2:
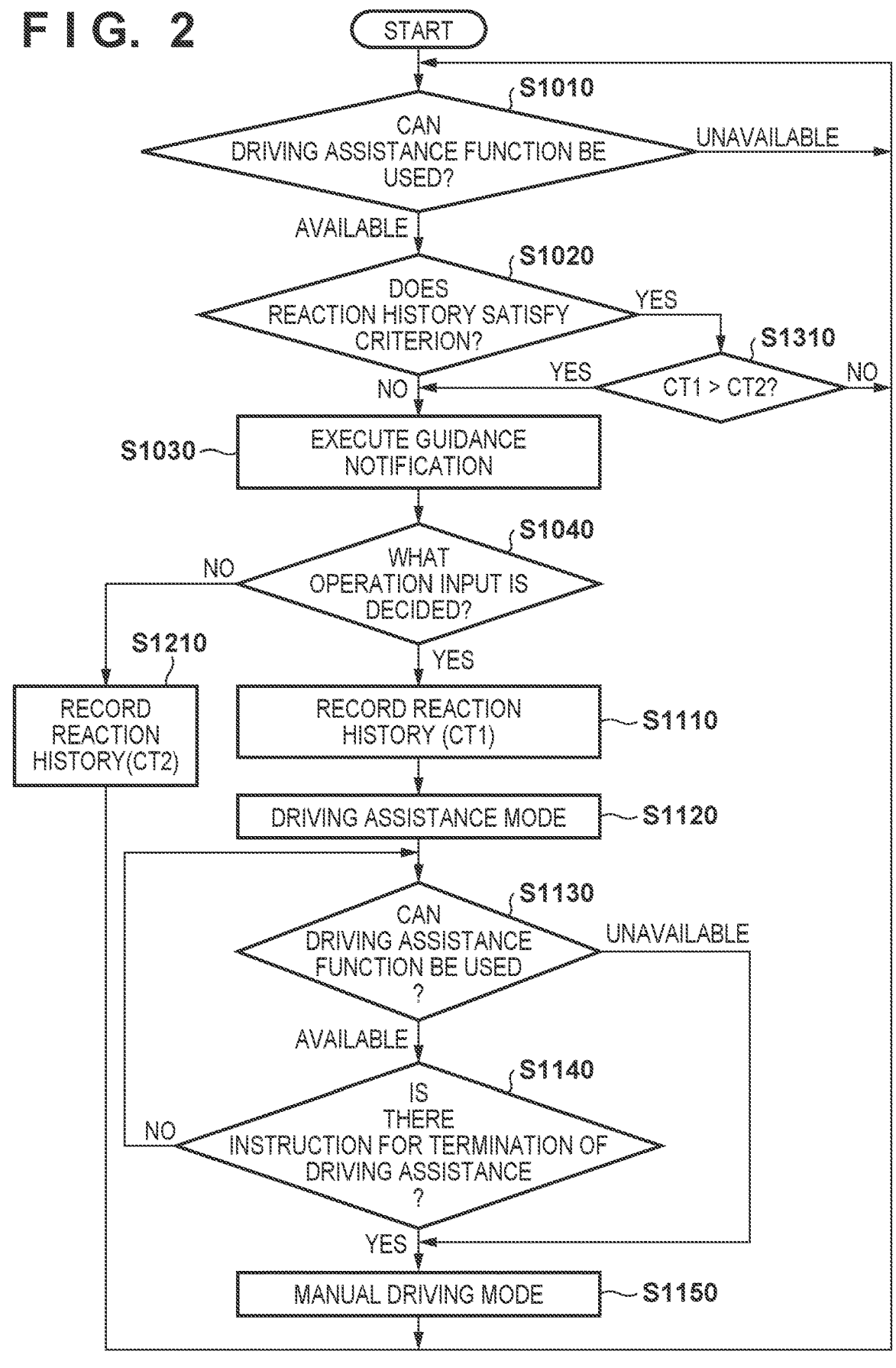
FIG. 2 is a flowchart illustrating an example of control contents by a driving assistance device.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Regarding Vehicle Configuration>

FIG. 1 is a perspective view of a structure of a vehicle 1 according to a first embodiment. The vehicle 1 includes wheels 11, a driving operation device 12, a travel environment acquisition device 13, and a driving assistance device 14. In the present embodiment, the vehicle 1 is a four-wheeled vehicle including a pair of left and right front wheels and a pair of left and right rear wheels as the wheels 11, but the number of wheels is not limited to this example, and for example, the vehicle 1 may be a two-wheeled vehicle or a three-wheeled vehicle.

The driving operation device 12 includes an acceleration operator 12a, a braking operator 12b, and a steering operator 12c. The acceleration operator 12a is an operator for accelerating or maintaining traveling of the vehicle 1, and an accelerator pedal can be typically used. The braking operator 12b is an operator for decelerating or stopping the vehicle 1, and a brake pedal can be typically used. The steering operator 12c is an operator for changing a traveling direction of the vehicle 1, and a steering wheel can be typically used. Note that other methods such as a lever may be adopted for the operator 12a and the like.

The travel environment acquisition device 13 is configured to be able to acquire a travel environment of the vehicle 1. The concept of the travel environment includes information necessary for realizing and maintaining appropriate travel of a self-vehicle, such as a road environment and presence or absence of an object. An example of the road environment is typically a lane on a road on which the vehicle is currently traveling, but as another example, attribute information indicating a type of a road such as a general road or an expressway is further exemplified. Examples of the object include another vehicle, a building, an installation, and another obstacle that should avoid contact with the self-vehicle.

As the travel environment acquisition device 13, a camera including a CCD/CMOS image sensor or the like is typically used, but alternatively/incidentally, a millimeter wave radar, a light detection and ranging (LiDAR), or the like may be used. Since the travel environment acquisition device 13 detects or monitors the travel environment, it may be expressed as a detection device, a monitoring device, or the like.

The attribute information indicating the type of the road may be acquired on the basis of the road mark or the road sign detected by the camera, or may be acquired by another means. For example, the travel environment acquisition device 13 may further include a global positioning system (GPS) sensor, and in this case, the attribute information may be acquired based on map information.

The driving assistance device 14 can control the driving operation device 12 instead of the driver, thereby performing driving assistance. The driving assistance herein means that the driving assistance device 14 substitutes a driver for at least a part of the driving operation (that is, the acceleration operation, the braking operation, and the steering operation).

Such a driving assistance function can be used in a predetermined travel environment (for example, a highway), and driving assistance by the driving assistance device 14 can be started in response to an operation input instructing the start of the driving assistance being performed by the driver.

For ease of explanation, among the operation modes of the vehicle 1 having such a driving assistance function, a state in which the driving assistance function is used is referred to as a driving assistance mode, and a state in which the driving assistance function is not used is referred to as a manual driving mode.

The driving assistance device 14 is typically configured by one or more electronic control units (ECUs). A function of each of the ECUs is realized by a central processing unit (CPU) executing a predetermined program while developing the program on a memory. Note that a part or all of the functions of the ECU may be realized by an application specific integrated circuit (ASIC), that is, the driving assistance function can be realized by both hardware and software.

<Guidance Notification of Driving Assistance Function>

FIG. 2 is a flowchart illustrating an example of control contents by the driving assistance device 14. This flowchart is started, for example, when the vehicle 1 is started, and can be typically performed while the travel environment acquisition device 13 acquires the travel environment of the vehicle 1. The outline is to change whether or not notification for recommending the use of the driving assistance function is made on the basis of a reaction history of the driver (or the user).

In step S1010 (Hereinafter, simply referred to as "S 1010". The same applies to other steps described later.), whether or not the driving assistance function can be used is decided. The use of the driving assistance function may generally be permitted in a predetermined travel environment (for example, a highway or the like). Therefore, this decision can be executed based on the travel environment of the vehicle 1 (for example, attribute information indicating the type of road). In a case where the driving assistance function is available, the process proceeds to S1020, and in a case where the driving assistance function is unavailable, the process returns to S1010.

In S1020, it is decided whether or not the reaction history described later satisfies a criterion with reference to the reaction history in the driver. For example, in a case where an amount of the reaction history satisfies a reference amount (Mainly, in a case where the reaction history is sufficiently accumulated), the process proceeds to S1310, and otherwise, the process proceeds to S1030.

In S1030, notification about guidance recommending use of the driving assistance function (hereinafter, "guidance notification") is executed. As the guidance notification, "YES" and "NO" may be displayed for selective operation input by the driver together with a message "Driving assistance function is available. Do you want to execute it?", for example. Such display can be realized by, for example, a touch panel display disposed in the vicinity of the driving operation device 12 or provided as a part of the driving operation device 12.

In S1040, the content of the operation input by the driver is decided. In this case, it is decided which one of "YES" and "NO" is selected by the operation input by the driver. The process proceeds to S1110 in a case where "YES" is input, and the process proceeds to S1210 in a case where "NO" is input.

In S1110, it is assumed that an operation input indicating determination of use of the driving assistance function has been made, and the operation input is cumulatively measured (The measurement value is defined as a value CT1.). That is, the measurement value CT1 corresponds to the cumulative number of times "YES" is selected in the decision of S1040. The measurement value CT1 is recorded as a part of the reaction history.

In S1120, the operation mode of the vehicle 1 is shifted to a driving assistance mode. As a result, the driver can use the driving assistance function.

In S1130, similarly to S1010, it is decided whether or not the driving assistance function can be used. In a case where the driving assistance function is available, the process proceeds to S1140, and in a case where the driving assistance function is unavailable, the process proceeds to S1150.

In S1140, it is decided whether or not an operation input for instructing termination of driving assistance has been performed. In a case where the operation input has been performed, the process proceeds to S1150, and otherwise, the process returns to S1130.

In S1150, it is notified that the driving assistance mode is terminated, and the operation mode of the vehicle 1 is shifted to a manual driving mode in response to the input of the driving operation to the driving operation device 12, for example. Note that in a case where no driving operation is input to the driving operation device 12 even after a predetermined time has elapsed, the driving assistance device 14 can stop the vehicle 1 at a predetermined position on a roadway edge such as a road shoulder. Thereafter, for example, in a case where the travel environment becomes one in which the driving assistance function is newly permitted, this flowchart can be restarted.

In S1210, it is assumed that an operation input indicating determination of non-use of the driving assistance function has been made, and the operation input is cumulatively measured (The measurement value is defined as a value CT2.). That is, the measurement value CT2 corresponds to the cumulative number of times "NO" is selected in the decision of S1040. The measurement value CT2 is recorded as another part of the reaction history. Thereafter, the process returns to S1010.

Here, a total value of the measurement values CT1 and CT2 substantially matches the number of times of the operation input indicating determination of use or non-use of the driving assistance function. Therefore, S1020 for deciding whether or not the reaction history satisfies the criterion may be performed, for example, on the basis of whether or not the total value of the measurement values CT1 and CT2 satisfies the criterion value.

Note that the reaction history may be recorded in a nonvolatile memory built in the ECU, or may be recorded in an external recording device such as a hard disk drive (HDD) or a solid state drive (SSD).

In S1310, whether or not to execute the guidance notification is decided on the basis of the reaction history. In a case where the guidance notification is to be executed, the process proceeds to S1030. Otherwise, the process returns to S1010, and the guidance notification is not executed (The execution of the guidance notification is suppressed.).

This decision can be made based on magnitude comparison between the measurement values CT1 and CT2. For example, in the case of CT1>CT2 (in a case where there is a strong tendency that the operation input indicating determination of use of the driving assistance function is performed), the process can proceed to S1030.

As another example, the magnitude comparison between the measurement values CT1 and CT2 may be performed on the basis of arithmetic processing using a predetermined coefficient. For example, in the case of (CT1×a1)>(CT2×a2), the process may proceed to S1030 using the weighting coefficients a1 and a2.

As still another example, in a case where the measurement value CT1 exceeds a reference and is larger than the measurement value CT2, the driving assistance function may be used without executing the guidance notification, and in this case, the process may proceed to S1120 instead of S1030.

According to the present embodiment, the operation input from the driver to the guidance notification is received, the content of the operation input is cumulatively measured as a reaction of the driver, and the measurement result is recorded as the reaction history. Whether or not to execute the guidance notification is determined on the basis of the reaction history recorded in this manner. Therefore, under a travel environment where the driving assistance function can be used, the guidance notification is executed or the execution thereof is suppressed based on the reaction history, and it is possible to prevent the guidance notification from being unnecessarily performed on the driver, thereby reducing the burden on the driver. The burden on the driver here may include not only the work burden of performing the operation input itself but also a mental burden such as discomfort and bother that the driver may feel at that time.

As described above, according to the present embodiment, it is advantageous to improve the usability of the vehicle 1 having the driving assistance function.

In the present example, whether or not guidance notification is possible is decided on the basis of the reaction history (see S1310), but alternatively, a mode of notification may be changed on the basis of the reaction history. As an example, the guidance notification may include a plurality of modes having different contents (for example, a description amount of the description of the driving assistance function), and for example, a simplified guidance notification and a detailed guidance notification may be selectively provided. In such a case, the guidance notification may be performed in a form in which one of the simplified description and the detailed description is selected on the basis of the reaction history. Such a configuration is also advantageous for improvement of usability.

Second Embodiment

Since the vehicle 1 may be used by any user, the foregoing reaction history may be managed for individual users. In a second embodiment, the reaction history is recorded for each user, and the reaction history for the user who is the driver of the vehicle 1 is referred when it is determined whether or not to execute the guidance notification.

FIG. 3 illustrates an example of a list of reaction histories recorded in a database DB1. According to the database DB1, a plurality of users U1, U2, U3, and the like are registered, and measurement values CT1 and CT2 are recorded for each user.

Which of the plurality of users U1 and the like is the driver may be specified by performing predetermined authentication at the time of starting the vehicle 1. According to the example of FIG. 3, for example, the guidance notification is given to the user U1, and the guidance notification is not given to the user U2 (see S1310).

According to the present embodiment, the vehicle 1 is configured to be able to register one or more users in the database DB1, and the reaction history is recorded for each user. According to such a configuration, it is possible to refer to the reaction history individually for any user, whereby it is possible to individually determine whether or not to execute the guidance notification, which is advantageous for further improving the usability of the vehicle 1.

Third Embodiment

It is conceivable that the driving assistance function is updated by updating an application program or the like. In such a case, it is considered preferable to notify the driver or the user of the content of the update, and at least a part of the reaction history may be initialized as necessary.

FIG. 4 is a flowchart illustrating an example of control contents by the driving assistance device 14. This flowchart is assumed to be started when the vehicle 1 is started, and the outline thereof is to decide whether or not the driving assistance function is updated and to initialize the reaction history in a case where the driving assistance function is updated.

In S3010, it is decided whether or not the driving assistance function is updated. The driving assistance function can be updated by reinstalling a program stored in a memory of the driving assistance device 14 as an example, but may be updated by wireless communication as another example. In a case where the driving assistance function is updated, the process proceeds to S3020, and otherwise, this flowchart is ended.

In S3020, the reaction history recorded in the database DB1 is initialized. Here, it is assumed that the entire reaction history is initialized. This flowchart may then end and the flowchart of FIG. 2 may begin.

Here, the following modifications are conceivable for the initialization of the reaction history.

First Example

It is also considered that the value of reference decreases for relatively old reaction histories. Therefore, the reaction history in which a predetermined time period has elapsed (For example, among the cumulatively measured values CT1 and CT2, values for which a predetermined time period has elapsed) may be initialized. This period may be set in advance, for example, in one month, one week, one day, or the like, or may be arbitrarily changed by the owner of the vehicle 1 or the like.

Second Example

On the other hand, in a case where the reaction history is initialized, thereafter, the decision in S1020 may be performed over a considerable period until the amount of the reaction history satisfies the reference amount (until the reaction history is sufficiently accumulated). Therefore, in a case where the driving assistance function is updated, a notification indicating that the driving assistance function has been updated (hereinafter, "update notification") may be given to each user by a first predetermined number of times (for example, once) after the update, and the flowchart of FIG. 2 may be executed in other cases.

Third Example

The driving assistance function generally includes a plurality of functions. Examples thereof include an inter-vehicle distance maintaining function of performing driving assistance so as to maintain a distance between the vehicle 1 and a preceding vehicle, a lane deviation prevention function of performing driving assistance so as to prevent the vehicle 1 from deviating from a lane, and other sub-functions such as a user interface (UI) and an audio guide. In a case where only a part of the plurality of functions is updated, it is considered that it is not necessary to initialize the entire reaction history.

Therefore, for example, the reaction history may be recorded while being managed for each function, and only a part of the reaction history related to the updated content may be initialized. Alternatively, the update notification may be performed only a first predetermined number of times (for example, once) for the updated contents, and the flow-chart of FIG. 2 may be executed for other contents.

As described above, according to the present embodiment, in addition to the effects similar to those of the first and second embodiments described above, the update notification is performed in a case where the driving assistance function is updated, which is advantageous for further improving the usability of the vehicle 1.

Note that, according to the above embodiment, it is also possible to further improve the social environment, such as providing a safe traffic environment, in addition to the usability of the vehicle 1.

In the descriptions heretofore, in order to facilitate the understanding, each element has been indicated with a name related to its functional aspect. However, each element is not limited to an element including a content that has been described in the embodiments as its main function, and may include the content as a supplementary function. Thus, each element may be replaced with a similar expression without being limited by its expression. For the same purpose, the expression "device" may be replaced with "unit", "part (component, piece)", "member", "structure", "assembly" or the like, or may be omitted or attached.

Summary of Embodiments

Some features exemplified in the embodiments are as follows:

[1]
An in-vehicle driving assistance device (14) comprising:
a decision unit (S1010) configured to decide whether or not to use a driving assistance function based on a travel environment of a vehicle (1);
a notification unit (S1030) configured to notify a driver of the vehicle of a guidance recommending use of the driving assistance function in a case where the decision unit decides that the driving assistance function is usable;
a recording unit (S1110, S1210) configured to record a reaction from the driver to the notification by the notification unit as a reaction history; and
a determination unit (S1310) configured to determine a mode of the notification by the notification unit based on the reaction history recorded in the recording unit.

Thereby, unnecessarily burden on the driver, which may be caused by the above guidance, is reduced, and the usability of the vehicle is improved.

[2]
The driving assistance device according to [1], further comprising
a reception unit configured to receive an operation input from the driver to the notification by the notification unit, wherein
the recording unit
cumulatively measures the operation input as a first value (CT1) in a case where the reception unit receives the operation input indicating determination of use of the driving assistance function,
cumulatively measures the operation input as a second value (CT2) in a case where the reception unit receives the operation input indicating determination of non-use of the driving assistance function, and
records the first value and the second value as a reaction history, and
the determination unit determines a mode of execution of the notification by the notification unit based on a comparison result between the first value and the second value.
Thereby, the above determination can be performed relatively easily.

[3]
The driving assistance device according to [1], further comprising
a registration unit configured to register a user who is the driver, the registration unit being configured to be capable of registering one or more users, wherein
the recording unit records a reaction history for each user, and
the determination unit determines a mode of execution of the notification by the notification unit for each user.
Thereby, the above vehicle becomes available for various users.

[4]
The driving assistance device according to [1], wherein
the determination unit determines whether or not the notification by the notification unit is possible based on the reaction history recorded in the recording unit.
Thereby, it becomes possible to prevent an unnecessarily guidance to the driver.

[5]
The driving assistance device according to [1], further comprising:
an update unit configured to update the driving assistance function; and
an initialization unit configured to initialize the reaction history recorded in the recording unit in a case where the driving assistance function is updated by the update unit.
Thereby, the notification is performed properly in a case where the driving assistance function is updated.

[6]
The driving assistance device according to [5], wherein
the initialization unit initializes the reaction history recorded by the recording unit after a predetermined period elapses.
Thereby, the notification is performed properly.

[7]
The driving assistance device according to [5], wherein
the driving assistance function includes a plurality of functions, and in a case where a part or all of the plurality of functions is updated by the update unit, the notification unit notifies a guidance for recommending use of the updated function in a predetermined manner regardless of the reaction history recorded by the recording unit.

Thereby, the notification is performed properly.

[8]

A vehicle comprising:

the driving assistance device according to [1];

a driving operation device; and a wheel.

That is, the above driving assistance device can be adopted to a typical vehicle comprising a driving assistance function.

[9]

A method of providing driving assistance, comprising:

a step of deciding whether or not to use a driving assistance function based on a travel environment of a vehicle;

a step of notifying a driver of the vehicle of a guidance recommending use of the driving assistance function in a case where the driving assistance function is decided to be usable;

a step of recording a reaction from the driver to the notification as a reaction history; and a step of determining a mode of the notification based on the reaction history.

Thereby, it becomes possible to obtain the same effect as [1].

[10]

A computer readable storage medium storing a program for causing a computer to execute each of the steps of the method according to [9].

Thereby, it becomes possible to obtain the same effect as [1].

The invention is not limited to the foregoing embodiments, and various variations/changes are possible within the spirit of the invention.

What is claimed is:

1. An in-vehicle driving assistance device comprising:

at least one processor circuit with a memory comprising instructions that, when executed by the processor circuit, cause the at least one processor circuit to at least:

decide whether or not to use a driving assistance function based on a travel environment of a vehicle;

notify a driver of the vehicle of a guidance recommending use of the driving assistance function in a case when the driving assistance function is decided to be usable;

record a reaction from the driver to the notification as a reaction history;

receive an operation input from the driver to the notification; and determine execution or suppression of the notification based on the reaction history recorded, wherein the recording further comprises:

cumulatively measuring the operation input as a first value in a case where the operation input received indicates determination of use of the driving assistance function, cumulatively measuring the operation input as a second value in a case where the operation input received indicating determination of non-use of the driving assistance function, and recording the first value and the second value as a reaction history, and the determining determines the execution or suppression of the notification based on a comparison result between the first value and the second value.

2. The driving assistance device according to claim 1, wherein the instructions, when executed by the processor circuit, further cause the at least one processor circuit to at least:

register a user who is the driver, where the instructions are further configured to cause the at least one processor to register one or more users, wherein a reaction history is recorded for each user, and a mode of execution of the notification is determined for each user.

3. The driving assistance device according to claim 1, wherein the instructions, when executed by the processor circuit, further cause the at least one processor circuit to at least determine whether or not the notification is possible based on the reaction history recorded.

4. The driving assistance device according to claim 1, wherein the instructions, when executed by the processor circuit, further cause the at least one processor circuit to at least:

update the driving assistance function; and initialize the reaction history recorded in a case where the driving assistance function is updated.

5. The driving assistance device according to claim 4, wherein the reaction history recorded is initialized after a predetermined period elapses.

6. The driving assistance device according to claim 4, wherein the driving assistance function includes a plurality of functions, and in a case where a part or all of the plurality of functions is updated, a guidance is notified for recommending use of the updated function in a predetermined manner regardless of the reaction history recorded.

7. A vehicle comprising:

the driving assistance device according to claim 1;

a driving operation device; and a wheel.

8. A method of providing driving assistance, comprising:

a step of deciding whether or not to use a driving assistance function based on a travel environment of a vehicle;

a step of notifying a driver of the vehicle of a guidance recommending use of the driving assistance function in a case where the driving assistance function is decided to be usable;

a step of recording a reaction from the driver to the notification as a reaction history;

a step of receiving an operation input from the driver to the notification; and a step of determining execution or suppression of the notification based on the reaction history, wherein the step of recording includes cumulatively measuring the operation input as a first value in a case where, in the step of receiving, the operation input indicating determination of use of the driving assistance function is received, cumulatively measuring the operation input as a second value in a case where, in the step of receiving, the operation input indicating determination of non-use of the driving assistance function is received, and recording the first value and the second value as a reaction history, and the execution or suppression of the notification is deter-
mined based on a comparison result between the first
value and the second value.

9. A computer readable storage medium storing a program
for causing a computer to execute each of the steps of the
method according to claim 8.

* * * * *